Oct. 18, 1927.  1,645,964
H. C. MUMMERT
AIRPLANE FUSELAGE
Filed Dec. 17, 1925   2 Sheets-Sheet 1
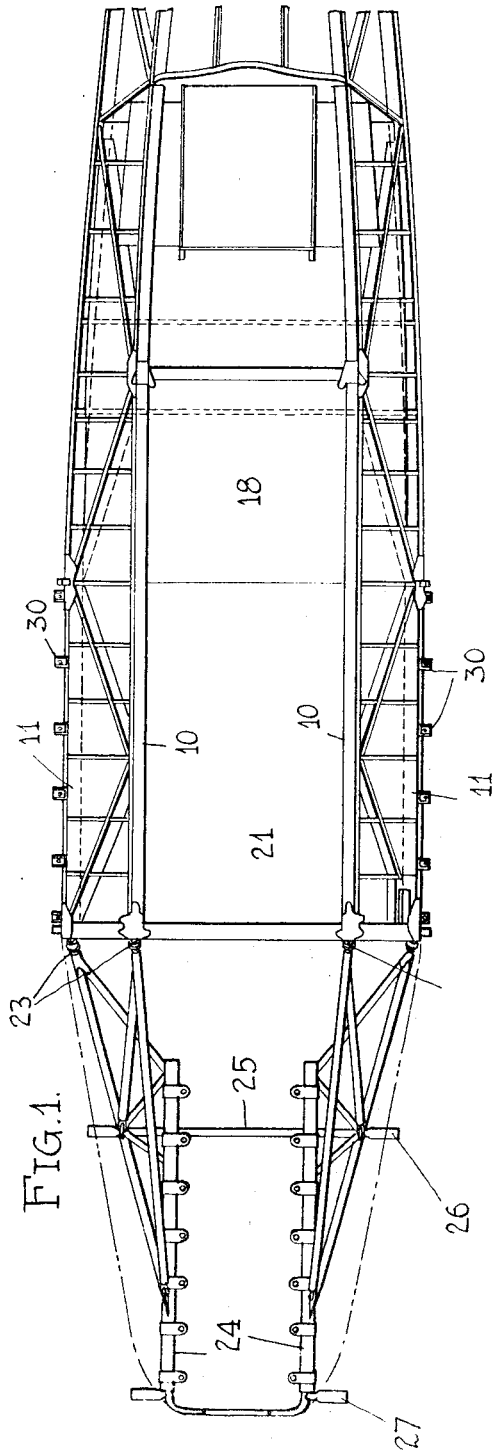
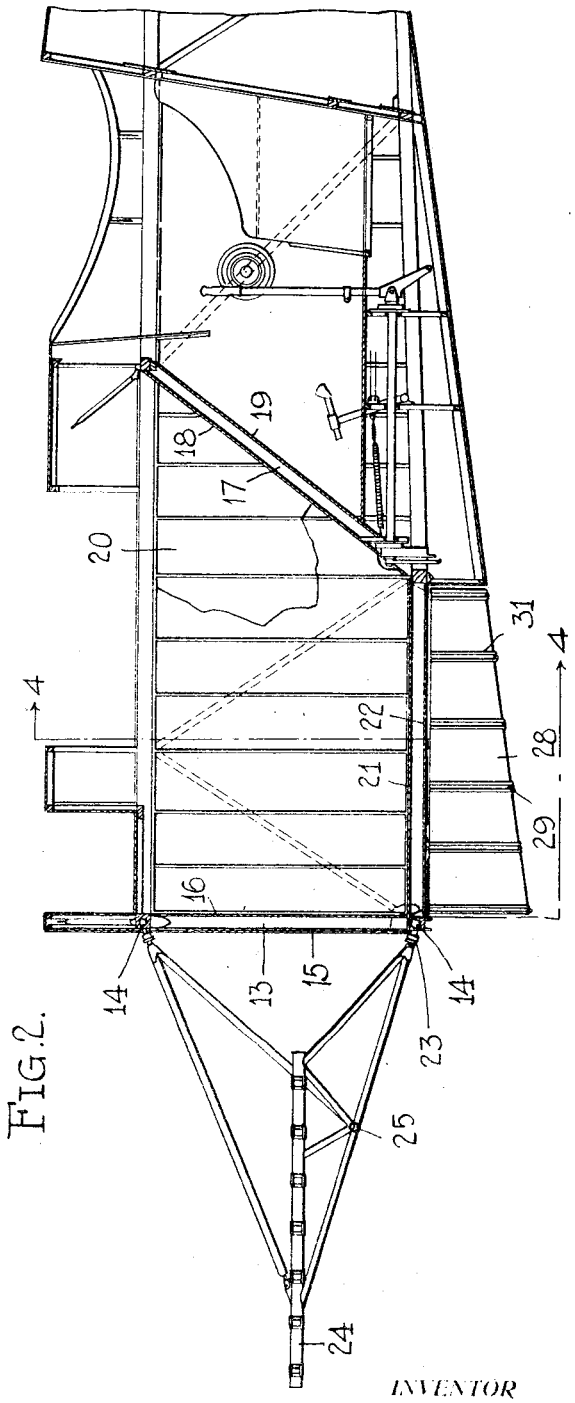
INVENTOR
HARVEY C. MUMMERT.
BY
ATTORNEY

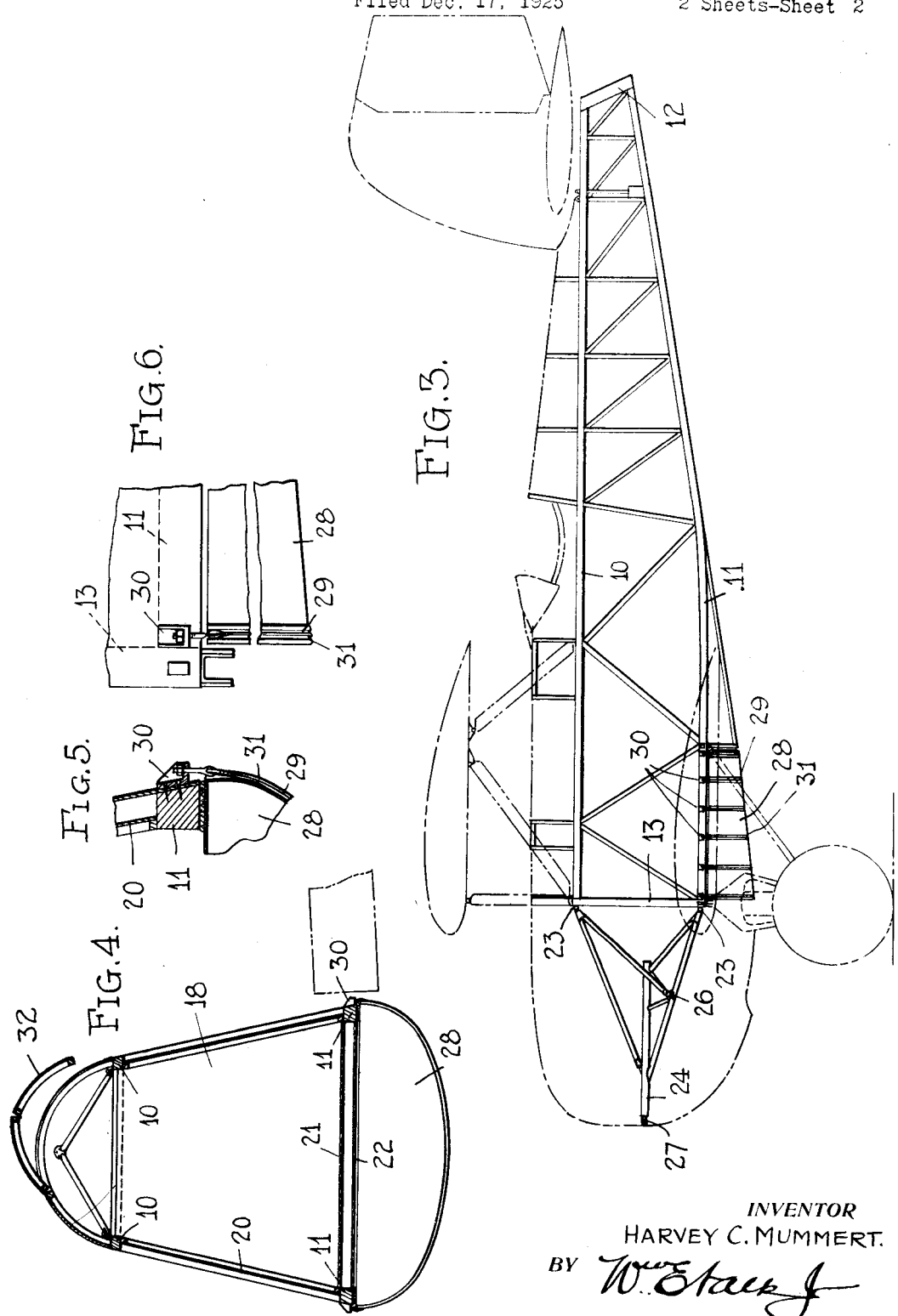

Patented Oct. 18, 1927.

1,645,964

UNITED STATES PATENT OFFICE.

HARVEY C. MUMMERT, OF HAMMONDSPORT, NEW YORK, ASSIGNOR TO AERIAL SERVICE CORPORATION, A CORPORATION OF NEW YORK.

AIRPLANE FUSELAGE.

Application filed December 17, 1925. Serial No. 75,897.

My invention relates to airplane fuselages.

A characteristic of the invention is the provision of an airplane fuselage having a shape in cross-section such that the sides thereof diverge downwardly very appreciably at a point intermediately of its ends, such divergence, and from such intermediate point rearwardly, gradually disappearing, until at the extreme rear end of the fuselage, the sides thereof extend substantially vertically and parallel. A fuselage thus formed is wider and bigger at the bottom than it is at the top; it is especially desirable in a commercial type airplane in view of the relatively large available cockpit and pay-load space; and it is, in view of this cross-sectional shape, further desirable and advantageous, in that the occupant or occupants thereof can, without leaning out over the sides of the fuselage, and notwithstanding its width at the bottom, see in a downward direction to the same extent and throughout the same angles as in existing types of airplane bodies.

From a structural viewpoint the fuselage of the present invention is further desirable. The longérons, of which there are four, are deeper and wider than usual. Each of said longérons, throughout a considerable portion of its length, is so formed and shaped as to provide a relatively large bearing or gluing surface to which the side covering is directly attached or glued. Throughout the pay-load space and the cockpit space, the fuselage frame is doubly reinforced or strengthened longitudinally. In addition to said outer rigid covering an inner covering is provided. Said inner covering strengthens the fuselage where maximum strength is required and affords at the same time a perfectly smooth inner covering for the storage compartment as well as the cockpit. All structural parts of the fuselage skeleton are confined to the space between said inner and said outer covering. The engine bed is directly attached, by ball and socket connections to the four longérons, and one or more steps are formed on the engine mount by extending portions thereof laterally thru and beyond the motor cowling. The above and other structural characteristics of the invention will be hereinafter more fully described.

In the drawings, wherein like reference characters denote like or corresponding parts, Fig. 1 is a plan view of the forward portion of the fuselage skeleton;

Fig. 2 is a longitudinal vertical sectional view of that part of the fuselage illustrated in Fig. 1;

Fig. 3 is a side elevation of the fuselage skeleton, the broken lines indicating the relation of the landing gear, wings, motor cowling, tail unit, etc., with respect thereto;

Fig. 4 is a transverse vertical sectional view on the line 4—4 of Fig. 2;

Fig. 5 is a detail sectional view showing the manner in which the gas tank is supported beneath the fuselage frame, and Fig. 6 is a side elevation further illustrating the gas tank mount.

In the embodiment of the invention selected for illustration, the fuselage skeleton comprises two upper longérons 10 and two lower longérons 11, the latter being spaced apart a greater distance than are the said upper longérons 10. From their forward ends the upper longérons 10 converge rearwardly to a point of merger at the tail end of the fuselage. The lower longérons 11 likewise converge rearwardly, the convergence, however, being slightly greater than the degree of convergence accorded said upper longérons. At the extreme rear end both sets of longérons 10 and 11 are fastened to a stern post 12 slightly inclined to the vertical. The fuselage skeleton, in view of the longéron arrangement, is of trapezoidal section throughout its length, the upper included angles of the successive trapezoids being obtuse angles in each instance and the lower included angles of the successive trapezoids being in each instance acute. Thus characterized the fuselage skeleton is narrower at the top than it is at the bottom and of gradual decreasing cross-sectional area from an intermediate point rearwardly.

At the extreme forward end of the several longérons, vertical fuselage struts 13 and horizontal fuselage struts 14 are provided. Said struts 13 and 14 are completely enclosed. On the forward side thereof a transverse firewall 15, lined with asbestos, is provided. On the rear side thereof a transverse cover-plate 16 is disposed. Collectively the firewall and cover-plate 16 constitute a transverse bulkhead at the extreme forward end of the fuselage frame. Said bulkhead defines the forward end of a storage compartment within which the pay-load is adapted to be enclosed. At its rear end the storage compartment is separated from the cockpit space by an inclined transverse bulkhead 17 which also comprises a forward cover-plate 18 and a rear cover-plate 19 between which certain transverse brace members included in the skeleton frame of the fuselage are confined.

From end to end the sides of the fuselage skeleton are provided with an outer rigid covering glued to the longerons. The side covering is adapted to diverge downwardly at or near the forward end of the fuselage, such divergence gradually disappearing until, at the rear end of the fuselage, the sides thereof extend substantially vertical and parallel. From the forward transverse bulkhead to the transverse bulkhead at the rear end of the cockpit space the fuselage is reinforced longitudinally by a rigid inner covering 20 at each side of the skeleton frame. Said inner covering 20 is spaced from the outer covering which is carried throughout the full length of the fuselage a distance equal to the width of the longerons, and like said outer covering, is glued to the longerons at the top and bottom of the frame. The longerons 10 and 11 throughout the length of the storage compartment and throughout the length of the cockpit space are deeper and wider than usual, such increase in size providing the necessary relatively large gluing surface for the attachment of the inner and the outer covering. The storage compartment, it will be noted, is narrower at the bottom than it is at the top in a fore and aft direction, tho wider at the bottom than it is at the top transversely of the machine. The inner covering 20 and the bulkheads at the ends of said compartment make the walls thereof perfectly smooth thereby adapting said compartment to the reception of such pay-load as mail, etc. Double flooring 21 and 22, extending from one to the other of lower longerons 11 and from the forward bulkhead to the inclined bulkhead, provides the bottom of the compartment with the necessary bottom wall. At the extreme forward end of the fuselage frame the engine mount is disposed. Said mount is fastened to the fuselage frame by four ball and socket connections 23, disposed one each at the respective forward ends of the four longerons. Such ball and socket connections admit of the adjustment of the engine bed and the lining up thereof in the assembly of the machine. The engine bed per se is designated as 24. From the ball and socket connections 23 the engine bed braces diverge forwardly as indicated in Fig. 2. Preferably such braces are constructed of metal tubing as are also the bearers 24. One of said tubular braces, designated as 25, is carried thru the outer covering of the fuselage to project therebeyond at opposite sides of the engine mount, said projecting portions constituting the steps 26 upon which a mechanic or other person may stand when inspecting or overhauling the motor. Other and further steps 27, if desired, may be provided at the extreme forward end of the engine mount as indicated in Fig. 1.

The gas tank 28 is carried beneath the fuselage frame (see Fig. 3). It is suspended therebeneath by straps 29 carried under the tank and fastened in brackets 30 mounted on the outside of the fuselage immediately adjacent the root ends of the airplane wings. The brackets 30 are thus positioned at points where a minimum of resistance is encountered. If desired, the gas tank 28 may be ridged as indicated at 31 to hold the straps 29 in place.

Except for the engine mount the fuselage in its entirety is preferably constructed of wood throughout and covered with birch veneer. The longerons are each made from one length of spruce without splices, the maximum cross-sections extending throughout the length of the storage space and the cockpit space, such increased section giving greater initial strength and allowing ample gluing surface for the proper securing of the veneer covering. As intimated, the outer veneer covering diverges downwardly at a substantial angle, such divergence giving ample interior storage space and cockpit space at the bottom of the fuselage without obstructing in any way the downward range of vision. Thus formed, the occupant or occupants of the machine have a clear and unobstructed vision in a downward direction without leaning out over the sides of the body or without leaving the seat or seats.

In lining the cockpit and the storage space with veneer (the inner covering) additional strength is provided. Such finish also provides a perfectly smooth inner wall which gives the pilot every chance to get out easily without danger of fouling his parachute in the event of an emergency.

The storage or mail compartment is wide at the bottom and narrower at the top. It is perfectly smooth inside, without any projections, and is situated immediately forward of the cockpit on the center of gravity of the machine. It is preferably lined with medium gauge duralumin with single sheets forming each side, such material being light and strong and providing exceptional protection to the mail against fire. A double hinged door 32, at the top of the compartment, affords free access to the interior.

An airplane fuselage of the character disclosed is especially adapted to the carrying of mail. It is strong and comparatively light. It is shaped to accommodate a maximum load without any interference whatsoever with the vision of the pilot. It is of good streamline section and so organized as to admit of the quick detachment of the engine mount as a whole. The cockpit space and the storage compartment being lined throughout tends to avoid all fire hazard and to give maximum strength where greater strength is needed. It is further useful in that perfectly smooth inner walls are provided where both the pilot and the pay-load are housed.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. A fuselage for airplanes having a shape in cross-section such that the sides thereof diverge downwardly very appreciably at a point intermediately of its ends, such divergence continuing rearwardly, tho gradually lessening, until at the extreme rear end of the fuselage the sides thereof extend substantially vertical and parallel, said fuselage having formed in its top enclosing wall at said intermediate point, a cockpit opening of substantially equal transverse dimension to the corresponding dimension of the fuselage at the point where the cockpit is formed.

2. A fuselage for airplanes comprising a skeleton frame of progressively decreasing trapezoidal section from an intermediate point rearwardly, each successive trapezoid, throughout substantially the entire length of the fuselage, defining two acute angles and two obtuse angles, the acute angles, in each instance, being the lower included angles of the successive trapezoids, and the obtuse angles, in each instance, being the upper included angles thereof.

3. A fuselage for airplanes including a skeleton frame comprising two upper and two lower longérons, a motor mount fastened to said frame at the forward end of each said longéron and a ball and socket connection between said motor mount and said frame at each said point of attachment.

4. A fuselage for airplanes including a skeleton frame, an outer fuselage covering, a motor mount enclosed within said outer covering and fastened to said frame, and an integral extension of the motor mount let thru said outer covering to provide at one side thereof a step.

5. A fuselage for airplanes including, in combination with the airplane wings, a skeleton frame, an outer covering for said frame, brackets fastened to said frame upon the exterior of said covering at opposite sides of the fuselage, the total number of brackets being in line with the butt ends of said wings, a tank mounted beneath the fuselage between the butt ends of said wings, and straps extended from one to the other of the brackets at opposite sides of said fuselage and beneath said tank to hold it (the tank) in place.

6. A fuselage for airplanes including a skeleton frame comprising upper and lower longérons, vertical fuselage struts connecting the forward ends of said upper and lower longérons at opposite sides of the fuselage, said fuselage having formed therein, immediately behind said fuselage struts, a storage compartment and immediately behind said storage compartment, a cockpit, said compartment and said cockpit being equal in depth and in width to the depth and width of the fuselage frame, an outer rigid fuselage covering extended rearwardly from said fuselage struts to a point beyond the rear end of said cockpit, and an inner rigid fuselage covering extended rearwardly from said fuselage struts to the rear end of said cockpit, said outer and said inner fuselage covering having disposed between them other and further structural elements of said fuselage frame.

7. A fuselage for airplanes including a skeleton frame comprising upper and lower longérons each of which terminates in the same transverse vertical plane, a transverse fire wall connecting said longérons at their forward ends, a transverse bulkhead likewise connecting said longérons immediately behind said fire wall, a second transverse bulkhead likewise connecting said longérons at a point rearwardly removed from said first mentioned bulkhead, said two bulkheads defining the opposite ends of a storage compartment within the fuselage frame, an outer rigid covering for the fuselage extended from one to the other of said bulkheads, and an inner rigid covering for the fuselage likewise extended from one to the other of said bulkheads, said outer and said inner covering having disposed therebetween said longérons, and other and further structural elements of the fuselage frame.

In testimony whereof I hereunto affix my signature.

HARVEY C. MUMMERT.